Jan. 10, 1950   R. O. RHODES   2,494,407
ARTIFICIAL BAIT
Filed Nov. 12, 1948
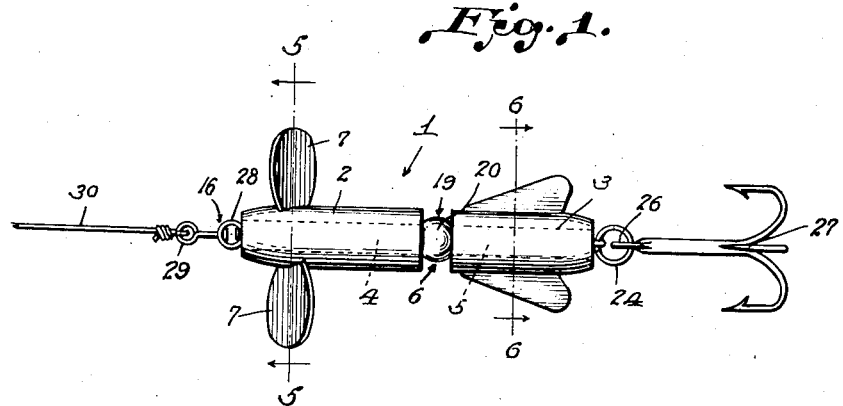
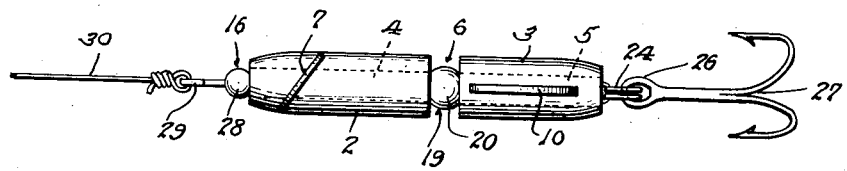
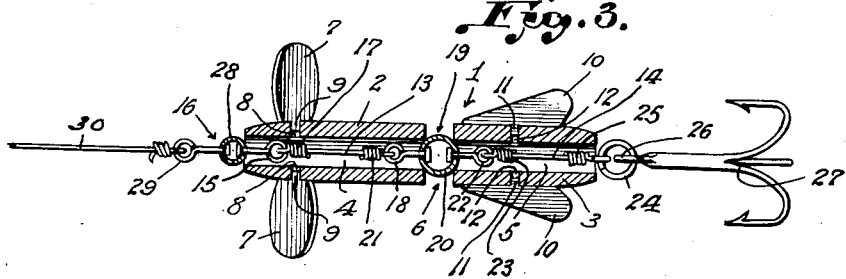
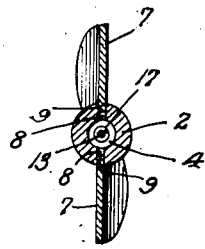
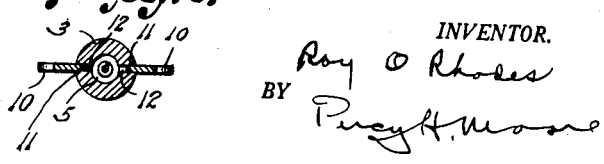
INVENTOR.
Roy O. Rhodes
BY Percy H. Moore
ATTORNEY.

Patented Jan. 10, 1950

2,494,407

UNITED STATES PATENT OFFICE 2,494,407

ARTIFICIAL BAIT

Roy O. Rhodes, Martinsburg, Pa.

Application November 12, 1948, Serial No. 59,597

1 Claim. (Cl. 43—42.05)

This invention relates to fishing tackle and more particularly to artificial bait or minnows of the under-water type particularly adaptable for game fishing.

One object of the present invention is to provide an artificial bait which, in action, simulates the life-like movements and appearance of live bait to a maximum degree.

Another object of the invention is to provide a sectional artificial bait of such construction that when a fish strikes the front section of the body of the bait is driven up the fishing line thus reducing the weight of the lure at the fish's mouth and increasing the difficulty encountered by the fish in shaking itself free from the hook.

A further object is to provide an artificial bait the parts of which can be economically constructed and easily assembled.

Other objects and advantages of my invention will be apparent as the specification is considered in connection with the accompanying drawing, in which:

Figure 1 is a plan view of the artificial bait with the parts in the approximate positions they occupy while the artificial bait is being drawn through the water;

Figure 2 is a side elevation of Figure 1;

Figure 3 is a longitudinal sectional view through Figure 1;

Figure 4 is a side elevation of the artificial bait showing the front body section advanced forwardly along the fishing line after the bait has been struck by a fish;

Figure 5 is a section taken along the line 5—5 of Figure 1; and

Figure 6 is a section taken along the line 6—6 of Figure 1.

Referring to the drawings by numerals, 1 denotes an artificial bait comprising a front section or body member 2 and a rear section or body member 3 of suitable material such as turned brass rod or tubing. The front and rear sections, after being turned to the desired substantially cylindrical shape, are drilled longitudinally to provide aligned bores 4 and 5, respectively. These bores, which extend throughout the entire length of the body members or sections are adapted to accommodate an internal rigging 6, which connects the sections 2 and 3 for independent rotation.

The front section 2 carries two oppositely disposed propellers 7 set at an angle, which cause the front section to revolve in a life-like manner, when the bait is trolled through the water. A transverse passage or bore 8 through the nose of the front section and intersecting the longitudinal bore 4 snugly receives, at its opposite open ends, reduced extensions or portions 9 of the propellers, any suitable means such as brazing, not shown, being employed to fix the propellers against displacement.

A pair of stabilizers or fins 10 are fixed to the rear section 3 of the artificial bait by means of reduced extensions or portions 11 adapted to snugly seat within the outer ends of a transverse bore 12, formed through the rear end of section 3, the reduced extensions 11 being finally and permanently secured in place in a manner similar to that followed in connection with the assembly of the propellers. Both the fins or stabilizers and the propellers are preferably made of sheet brass. While the function of the stabilizers are believed to be obvious from the foregoing it might be stated here that their function is to tend to prevent rotation of the rear section 3 so that rotation of section 3 will not correspond to that of section 2.

Referring to the rigging 6, the latter comprises a front or first wire 13 and a second or rear wire 14 positioned within the respective longitudinal aligned bores 4 and 5 of the sections 2 and 3. The forward end of the front wire 13 is connected to an eye 15 of a front swivel member 16 by passing that end of the wire through the eye 15 and then winding the returned end around the body of the wire as at 17. The opposite or rear end of the wire 13, is connected in a manner similar to that just described to an eye 18 of a middle swivel member 19, the latter including a spacer barrel 20, seated against and within the spaced opposing ends of the bores 4 and 5 for maintaining the sections 2 and 3 out of contact with each other. Thus the rear end of wire 13 is doubled back and wound around the body of the wire 13, as at 21.

The front end of the second or rear wire 14 is connected to an eye 22 by passing that end of the wire through the eye 22 and then winding the returned end around the body of wire 14, as at 23, the opposite or rear end of the wire 14 being similarly passed through and wound upon a split ring 24, as at 25, the length of the wire 14 and its connections at opposite ends to the barrel 20 and split ring 24 being such that the wire 14 will be maintained taut and longitudinal movement of the wire 14 through the bore 5 will be prevented. An eye portion 26 of a treble hook 27, is somewhat loosely attached to split ring 24, for freedom of pivotal movement with respect to the latter by spreading the ring and winding thereon the eye 26 of the hook, as on a key ring, enabling a change of hooks to be made at any time. As previously indicated herein the split ring 24 is of a size to prevent it from being drawn through the bore 5, and the spaced barrel 20 being sufficiently large to prevent the same from being pulled into either bore 4 or 5. Consequently the opposite ends of the rear body section 3 is securely and snugly clamped between opposite ends of the rear wire 14.

The front swivel member 16 includes a guide member or barrel 28, to the opposite sides of which the eye 15, previously mentioned, and a second eye 29, of front swivel member 16, are attached, the eye 29 providing means for attaching a conventional fishing line 30. The barrel 28 is adapted to seat snugly but for relative longitudinal movement through the bore 4 to frictionally guide the front section 2 over the wire 13, swivel member 16 and fishing line 30 during the movement of the front section under the impact of a strike. It will be understood that the barrel 28 is considerably larger than eyes 15 and 29, but much smaller than barrel 20, whereby the barrel 28 will frictionally engage in the bore 4, and slow down and guide the longitudinal movement of the front section 2, over or relatively to the front wire 13 and the fishing line 30.

Normally the two sections 2 and 3 of the lure are maintained in close frictional contact with opposite sides of the barrel 20, by the weight or pull of the hook, but when the fish strikes the front section 2 will be propelled forwardly up the fishing line a substantial distance from Figure 3 to Figure 4 position, thus reducing the weight of the lure at the fish's mouth and increasing the difficulties encountered by the fish in pulling or shaking itself free from the hook.

It will be noted that the front section 2 will revolve at relatively high speed while being propelled forward on the line when the fish strikes, due to one or all of the following reasons, namely: (1) The sudden stoppage of the rear section thus creating a forward thrust of the front section somewhat akin to the effect of a brake; (2) the rotary movement of the front section acting like a screw to pull itself forward due to the action of water against the blades and (3) the shaking of the lure by the fish in an effort to get free as it strikes, which will throw the front section up the line thus reducing the weight of the lure at the fish's mouth and preventing the fish from shaking the lure loose and (4) the revolving and wobbling action of the rear section creates a directional change of the entire lure both from side to side and up and down. This directional change, resulting from the ability of the rear section to swing off the entire lure's common axis, causes a rudder-like guidance of the lure in simulation of the true action of a live minnow and correspondingly attracts the attention of the fish.

From the foregoing it will be seen that the stabilizing action of the rear section and hooks minimizes the danger of the lure rolling out of the fish's mouth, assuring a more positive catch on the fish that strikes.

Having thus described my invention, what I claim is:

An artificial bait or lure comprising front and rear longitudinal bored body sections, a flexible wire rigging providing a common axis for the lure, said rigging including a front wire in the bore of said front section and a rear wire in the bore of said rear body section, a barrel swivel connecting said wires swivelably together for independent relative rotation of said sections, the relative diameters of said barrel swivel and the bores of said sections being such that a considerable area of said barrel will be received and have a bearing fit within the opposite ends of the bores of said front and rear sections whereby said rear section is free to wobble and move in an up and down direction and serve to guide the directional movement of the entire lure in a sinuous manner, means on said rear section for tending to prevent rotation of the rear section relatively to the front section, said front section being forwardly and longitudinally movable over said front wire throughout the length of the latter and away from said rear section under the impact of a strike, and said swivel barrel preventing said rear section from moving substantially forward over said rear wire and toward said front section and a wire connecting the end of the front wire to a fishing line.

ROY O. RHODES.

REFERENCES CITED

The following references are of record in the file of this patent:

UNITED STATES PATENTS

| Number | Name | Date |
| --- | --- | --- |
| 661,869 | Henkenius | Nov. 13, 1900 |
| 1,299,703 | Gray | Apr. 8, 1919 |
| 1,467,116 | Reekers | Sept. 4, 1923 |
| 1,474,823 | Hines | Nov. 20, 1923 |